United States Patent [19]

Tran

[11] Patent Number: 5,713,039

[45] Date of Patent: Jan. 27, 1998

[54] REGISTER FILE HAVING MULTIPLE REGISTER STORAGES FOR STORING DATA FROM MULTIPLE DATA STREAMS

[75] Inventor: Thang M. Tran, Austin, Tex.

[73] Assignee: Advanced Micro Devices, Inc., Sunnyvale, Calif.

[21] Appl. No.: 567,665

[22] Filed: Dec. 5, 1995

[51] Int. Cl.⁶ .............................. G06F 9/34; G06F 12/00
[52] U.S. Cl. .................... 395/800; 395/476; 395/480
[58] Field of Search ................................ 395/452, 436, 395/391, 395, 595, 800, 480, 497.04, 494, 476; 365/189.01, 189.04, 230.03, 230.05

[56] References Cited

U.S. PATENT DOCUMENTS

| H1291 | 2/1994 | Hinton et al. | 395/800 |
|---|---|---|---|
| 4,893,279 | 1/1990 | Rahman et al. | 365/230.03 |
| 4,933,909 | 6/1990 | Cushing et al. | 365/230.05 |
| 5,023,844 | 6/1991 | Arnold et al. | 365/230.05 |
| 5,115,411 | 5/1992 | Kass et al. | 365/189.01 |
| 5,129,067 | 7/1992 | Johnson | 395/389 |
| 5,136,697 | 8/1992 | Johnson | 395/586 |
| 5,165,026 | 11/1992 | Kusakabe | 395/800 |
| 5,357,617 | 10/1994 | Davis et al. | 395/595 |
| 5,442,760 | 8/1995 | Rustad et al. | 395/391 |
| 5,513,363 | 4/1996 | Kumar et al. | 395/800 |
| 5,537,560 | 7/1996 | Boggs et al. | 395/595 |
| 5,574,939 | 11/1996 | Keckler et al. | 395/800 |
| 5,613,152 | 3/1997 | Van Meerbergen et al. | 395/800 |

OTHER PUBLICATIONS

Llosa, J. et al. "Non–Consistant Dual Register files to Reduce Register Pressure", Proceedings of the First IEEE Symposium on High–Performance Computer Architecture, pp. 22–31. 1/1995.

"Port–Multiplexed Register File ", IBM technical Disclosure Bulletin, pp. 6570–6573. 04/1985.

Johnson, M., Superscalar Microprocessor Design, pp.44–45. 1991. No Month.

Superscaler Microprocessor Design, Mike Jonson, Prentice Hall, englewood Cliffs, NJ (1991), pp. 92–94.

Primary Examiner—Tod R. Swann
Assistant Examiner—Conley B. King , Jr.
Attorney, Agent, or Firm—Conley, Rose & Tayon PC; B. Noel Kivlin

[57] ABSTRACT

A register file including multiple register storages and multiple read ports is provided. Each register storage stores a subset of the architected register set for the microprocessor within which the register file is employed. Each register storage is coupled to select ones of the multiple read ports, reducing wiring and complexity of the register file. Each read port is coupled to a subset of the registers within the register file. The subset of the registers to which the read port is coupled is defined by the register storage(s) to which the read port is coupled. Access to a particular register is thereby restricted to a subset of the read ports coupled to the register file. However, for data access patterns such as the data access patterns characteristic of DSP functions, such restrictions may have an insignificant impact upon performance. The independent data streams of typical DSP functions may each be stored within one of the separate subsets of the architected register set, allowing the DSP functions to concurrently access the operands from each data stream using the present register file. One read port upon each of the register storages is utilized by an instruction from the DSP functions. Although the size and complexity of the register file are decreased with respect to conventional register files, full functionality may be provided for the DSP functions.

13 Claims, 3 Drawing Sheets

REGISTER FILE HAVING MULTIPLE REGISTER STORAGES FOR STORING DATA FROM MULTIPLE DATA STREAMS

BACKGROUND OF THE INVENTION

1. Field of the Invention

This invention is related to the field of microprocessors and, more particularly, to register files employed within microprocessors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, impulse response (IR) filters, Fast Fourier Transforms (FFTs), matrix correlations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSP hardware often includes hardware configured to quickly perform a multiply-add sequence. An exemplary DSP is the ADSP 2171 available from Analog Devices, Inc. of Norwood, Mass.

As microprocessors continue to increase in performance due to increases in operating frequency and the number of transistors which may be included within a single semiconductor substrate, it becomes desirable to perform certain DSP functions within the microprocessor. Instruction code written in the x86 instruction set, for example, may perform the mathematical operations that DSPs typically perform. Cost of the computer system may be reduced through the elimination of one or more DSPs while still performing equivalent functionality.

Unfortunately, many typical microprocessor hardware configurations are not well suited for DSP processing. In particular, the register file normally employed in a microprocessor includes a large number of ports capable of accessing any register stored within the register file. Having a large number of ports, and having those ports capable of accessing any register within the register file, increases the amount of silicon area occupied by the register file. Silicon area may be increased due to wiring difficulties. Wiring within the register file is increased proportional to the number of ports and the number of registers accessible from each port. Additionally, each added port increases the number of transistors used to create the register file. Transistors are added as switches for allowing access of each port to a storage cell. Furthermore, storage cells may require duplication due to the additional ports.

Data access patterns in DSPs often comprise sequential access to a pair of independent data streams. Each data stream may comprise a sequence of data words used as one of the operands which are multiplied in the repetitive multiply-accumulate sequence defined above, for example. Data from each stream may be placed in separate subsets of registers within the register file. The data may then be operated upon by instructions which access the registers. Subsequently, new data may be placed into the registers and the process repeated. Therefore, random access to registers may not be required. A register file optimized for DSP data access patterns is desired.

SUMMARY OF THE INVENTION

The problems outlined above are in large part solved by a register file in accordance with the present invention. The register file includes multiple register storages and multiple read ports. Each register storage stores a subset of the architected register set for the microprocessor within which the register file is employed. Each register storage is coupled to select ones of the multiple read ports, as opposed to the full complement of read ports. Wiring and complexity of the register file are advantageously reduced, which may decrease the silicon area occupied by the register file as well as the amount of time required to access the register file. Cost of a microprocessor employing the register file may be decreased due to the reduced silicon area needed to employ the microprocessor. Clock cycle time may also be decreased to the extent that conventional register file access times limit the clock cycle time of the microprocessor.

Each read port is coupled to a subset of the registers within the register file. The subset of the registers to which the read port is coupled is defined by the register storage(s) to which the read port is coupled. Access to a particular register is thereby restricted to a subset of the read ports coupled to the register file. However, for data access patterns such as the data access patterns characteristic of DSP functions, such restrictions may have an insignificant impact upon performance. DSP functions often concurrently access a pair of independent data streams. The independent data streams may each be stored within one of the separate subsets of the architected register set. The separate subsets comprise the separate register storages, allowing the DSP functions to concurrently access the operands from each data stream using the present register file. One read port upon each of the register storages is utilized by an instruction from the DSP functions. Although the size and complexity of the register file are decreased with respect to conventional register files, full functionality may be provided for the DSP functions.

Broadly speaking, the present invention contemplates a register file comprising a first register storage and a second register storage. Each register storage is configured with a read port and comprises a plurality of storage locations corresponding to a plurality of registers. The read port upon each register storage is configured to access any one of the plurality of registers within the register storage via an indication upon the read port.

The present invention further contemplates a microprocessor comprising an instruction decode unit, a register file, and an execute unit. The instruction decode unit is configured to decode an instruction and to convey a first indication of a first register operand of the instruction upon a first bus. The instruction decode unit is further configured to convey a second indication of a second register operand of the instruction upon a second bus. The register file includes a first register storage having a first read port coupled to the first bus and a second register storage having a second read port coupled to the second bus. Additionally, the register file includes a first output bus coupled to the first register storage and a second output bus coupled to the second register storage. Each output bus is configured to convey a corresponding first or second register operand from the corresponding register storage upon receiving the aforementioned indications. Coupled to receive the instruction, the first register operand, and the second register operand, the execute unit is configured to execute the instruction upon the first register operand and the second register operand.

The present invention still further contemplates a computer system comprising a microprocessor coupled to a main memory. The microprocessor includes a register file configured with a plurality of register storages. Each of the plurality of register storages include storage corresponding to a plurality of registers. Each of the plurality of register storages further includes a separate read port. The main memory is configured to store instructions and data for access by the microprocessor.

BRIEF DESCRIPTION OF THE DRAWINGS

Other objects and advantages of the invention will become apparent upon reading the following detailed description and upon reference to the accompanying drawings in which.

Figure 1:
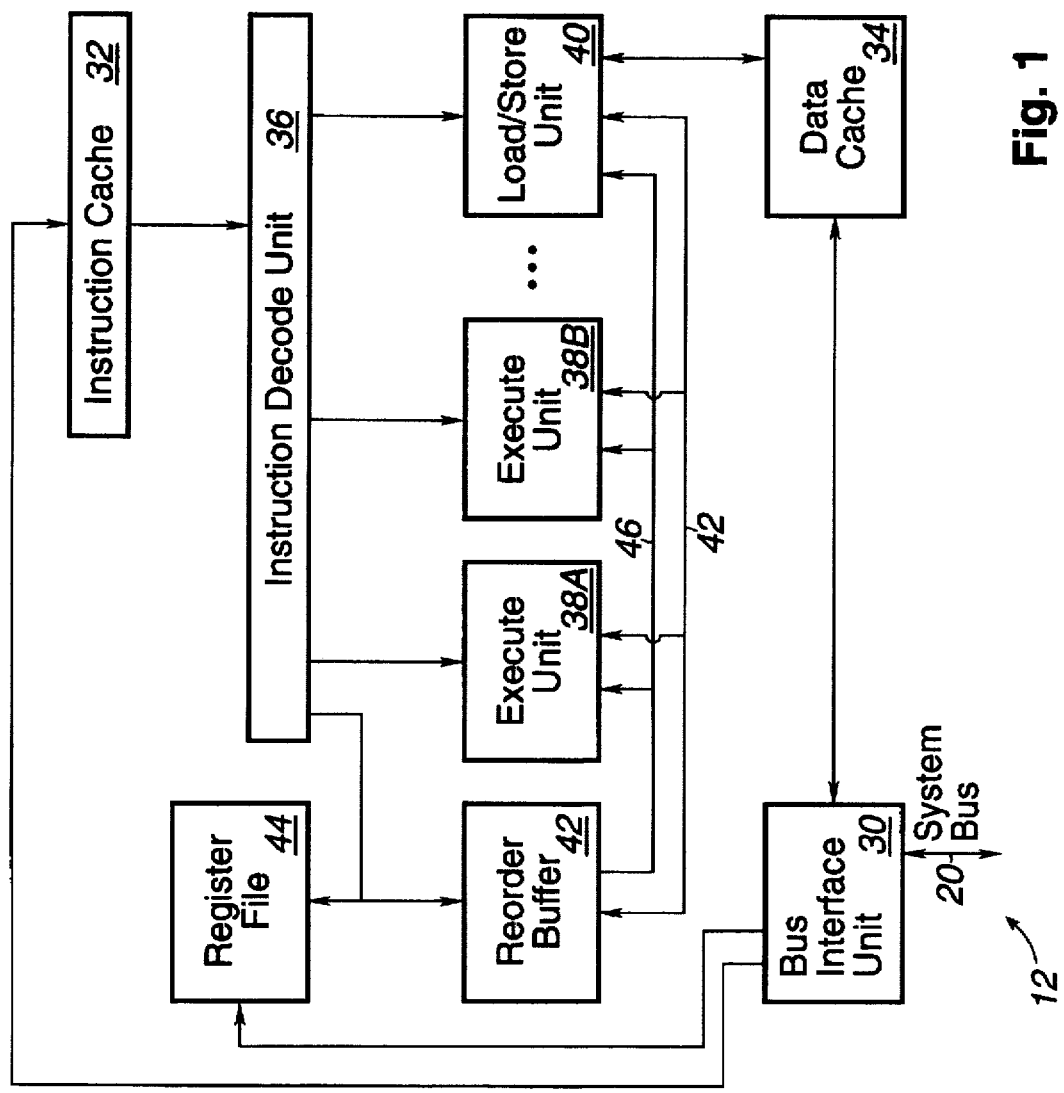
FIG. 1 is a block diagram of a microprocessor including a register file according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 12 is shown. Microprocessor 12 includes a bus interface unit 30, an instruction cache 32, a data cache 34, an instruction decode unit 36, a plurality of execute units including execute units 38A and 38B, a load/store unit 40, a reorder buffer 42, and a register file 44. The plurality of execute units will be collectively referred to herein as execute units 38, and may include more execute units than execute units 38A and 38B shown in FIG. 2. Additionally, an embodiment of microprocessor 12 may include one execute unit 38. Bus interface unit 30 is coupled to instruction cache 32, data cache 34, register file 44, and a system bus 20. Instruction cache 32 is coupled to instruction decode unit 36, which is further coupled to execute units 38, reorder buffer 42, register file 44, and load/store unit 40. Reorder buffer 42, execute units 38, data cache 34, and load/store unit 40 are each coupled to a result bus 48 for forwarding of execution results. Finally, load/store unit 40 is coupled to data cache 34.

Generally speaking, register file 44 is configured to store register values corresponding to registers defined by the microprocessor architecture to which microprocessor 12 is implemented. Register file 44 is configured with multiple register storages. Each register storage comprises a plurality of storage locations for concurrently storing multiple register values. An instruction may concurrently access up to one register within each register storage (i.e. each execution unit includes one read port into each register storage). Advantageously, the number of read ports upon each register storage is less than the total number of read ports configured into register file 44. By restricting the registers to which a particular read port has access, the overall silicon area may be reduced. Wiring from each port to the registers to which the port does not have access is eliminated. Transistors previously used as switches to allow such access are also eliminated. For data access patterns such as those common in DSP algorithms, the restriction of register operands for an instruction to register values stored in separate register storages may be insignificant.

For example, an embodiment of register file 44 employing two register storages is contemplated. Registers within a first register storage may be used to store data from a first data stream, while registers within a second register storage may be used to store data from a second data stream. If the two streams of data comprise operands for a multiply-accumulate sequence, the instructions within the multiply-accumulate sequence access the first register storage for an operand from the first data stream and the second register storage for an operand from the second data stream. The operands are fetched concurrently, as with a conventional register file in which each port may access any register within the file. However, the size and complexity of register file 44 is reduced as compared to conventional register files.

As used herein, the term "register" refers to a storage location configured within a microprocessor. An instruction may access the storage location via an instruction field which encodes an indication of the storage location (i.e. the storage location is defined to exist within the microprocessor by the microprocessor architecture to which the microprocessor is implemented). The set of registers defined by the microprocessor architecture to which microprocessor 12 is implemented is referred to as the architected register set. For example, the x86 microprocessor architecture includes an architected register set including the EAX, EBX, ECX, EDX, ESI, EDI, ESP, and EBP registers. A "register file" refers to a plurality of storage locations within a microprocessor which collectively store the architected register set of the microprocessor. It is noted that non-architected registers may also be stored within the register file. A number of "ports" are configured into the register file, wherein a port is defined as an access mechanism for the register file. A port allows one register within the register file to be accessed during a given time period, such as a clock cycle. A read port allows for a register value to be accessed, and so comprises an input bus indicating the register to be accessed and an output bus for conveying the corresponding register value. A write port allows for a register value to be modified, and so comprises an input bus indicating the register to be modified, the value to be stored as the modified value, and a write enable signal indicating that the modification should be performed. Register values accessed due to the execution of an instruction are referred to as operands or register operands. Accessing a register via a read port is referred to herein as reading the registers. Modifying a register via a write port is referred to herein as writing the register.

Other portions of microprocessor 12 will now be described. Instruction cache 32 is a high speed cache memory for storing instructions. It is noted that instruction cache 32 may be configured into a set-associative or direct mapped configuration. Instruction cache 32 may additionally include a branch prediction mechanism for predicting branch instructions as either taken or not taken. Instructions are fetched from instruction cache 32 and conveyed to instruction decode unit 36 for decode and dispatch to an execute unit 38 or load/store unit 40.

Instruction decode unit 36 decodes instructions. As used herein, "decoding" refers to transforming the instruction from the format defined by the microprocessor architecture employed by microprocessor 12 into a second format expected by execute units 38. Often, the second format comprises decoded control signals for controlling data flow elements such as adders and multiplexors in order to perform the operation the instruction defines. In the embodiment shown, instruction decode unit 36 decodes each instruction fetched from instruction cache 32. Instruction decode unit 36 dispatches the instruction to execute units 38 and/or load/store unit 40. Instruction decode unit 36 also detects the register operands used by the instruction and requests these operands from reorder buffer 42 and register file 44. In one embodiment, execute units 38 are symmetrical execution units. Symmetrical execution units are each configured to execute a particular subset of the instruction set employed by microprocessor 12. The subsets of the instruction set executed by each of the symmetrical execution units are the same. In another embodiment, execute units 38 are asymmetrical execution units configured to execute dissimilar instruction subsets. For example, execute units 38 may include a branch execute unit for executing branch instructions, one or more arithmetic/logic units for executing arithmetic and logical instructions, and one or more floating point units for executing floating point instructions. Instruction decode unit 36 dispatches an instruction to an execute unit 38 or load/store unit 40 which is configured to execute that instruction.

Load/store unit 40 provides an interface between execute units 38 and data cache 34. Additionally, memory dependencies between load and store memory operations are detected and handled by load/store unit 40.

Execute units 38 and load/store unit 40 may include one or more reservation stations for storing instructions whose operands have not yet been provided. An instruction is selected from those stored in the reservation stations for execution if: (1) the operands of the instruction have been provided, and (2) the instructions which are prior to the instruction being selected in program order have not yet received operands. It is noted that a centralized reservation station may be included instead of separate reservation stations. The centralized reservation station is coupled between instruction decode unit 36, execute units 38, and load/store unit 40. Such an embodiment may perform the dispatch function within the centralized reservation station.

Microprocessor 12 supports out of order execution, and employs reorder buffer 42 for storing execution results of speculatively executed instructions and for storing these results into register file 44 in program order; for performing dependency checking and register renaming; and for providing for mispredicted branch and exception recovery. When an instruction is decoded by instruction decode unit 36, requests for register operands are conveyed to reorder buffer 42 and register file 44. In response to the register operand requests, one of three values is transferred to the execute unit 38 and/or load/store unit 40 which receives the instruction: (1) the value stored in reorder buffer 42, if the value has been speculatively generated; (2) a tag identifying a location within reorder buffer 42 which will store the result, if the value has not been speculatively generated; or (3) the value stored in the register within register file 44, if no instructions within reorder buffer 42 modify the register. Additionally, a storage location within reorder buffer 42 is allocated for storing the results of the instruction being decoded by instruction decode unit 36. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register. In the embodiment shown, tags and/or operand values are conveyed upon an operand tags/value bus 46.

When execute units 38 or load/store unit 40 execute an instruction, the tag assigned to the instruction by reorder buffer 42 is conveyed upon result bus 48 along with the result of the instruction. Reorder buffer 42 stores the result in the indicated storage location. Additionally, execute units 38 and load/store unit 40 compare the tags conveyed upon result bus 48 with tags of operands for instructions stored therein. If a match occurs, the unit captures the result from result bus 48 and stores it with the corresponding instruction. In this manner, an instruction may receive the operands it is intended to operate upon. Capturing results from result bus 48 for use by instructions is referred to as "result forwarding".

Instruction results are stored into register file 44 by reorder buffer 42 in program order. Storing the results of an instruction and deleting the instruction from reorder buffer 42 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 42 discards the instructions subsequent to the mispredicted branch instruction or the instruction causing the exception. Instructions thus discarded are also flushed from execute units 38, load/store unit 40, and instruction decode unit 36.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

In one embodiment, register file 44 includes storage locations for each register defined by the microprocessor architecture employed by microprocessor 12. For example, microprocessor 12 may employ the x86 microprocessor architecture. For such an embodiment, register file 44 includes locations for storing the EAX, EBX, ECX, EDX, ESI, EDI, ESP, and EBP register values.

Bus interface unit 30 is configured to effect communication between microprocessor 12 and devices coupled to system bus 20. For example, instruction fetches which miss instruction cache 32 may be transferred from main memory 16 by bus interface unit 30. Similarly, memory operations performed by load/store unit 40 which miss data cache 34 may be transferred from main memory 16 by bus interface unit 30. Additionally, data cache 34 may discard a cache line of data which has been modified by microprocessor 12. Bus interface unit 30 transfers the modified line to main memory 16.

Microprocessor 12 may be configured to execute certain load instructions which indicate that the data should not be cached in data cache 34. These load instructions may be employed when accessing DSP data streams, since the data may be used in a particular multiply-accumulate iteration and then not accessed again for a relatively long period of time. Because the data is not cached in data cache 34, bus interface unit transfers the data directly to register file 44. The register intended to store the data is conveyed to bus interface unit 30 along with the command to perform the load, and bus interface unit 30 conveys an indication of the register along with the data to a write port upon register file 44. The data is thereby stored directly into register file 44 from bus interface unit 30.

It is noted that instruction decode unit 36 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 34, executing the instruction, and transferring the result to memory (if the destination operand is a memory location). Load/store unit 40 performs the memory transfers, and an execute unit 38 performs the execution of the instruction. It is further noted that instruction decode unit 36 may be configured to decode multiple instructions per clock cycle. In one embodiment, instruction decode unit 36 is configured to decode and dispatch up to one instruction per execute unit 38 and load/store unit 40 per clock cycle.

Figure 2:
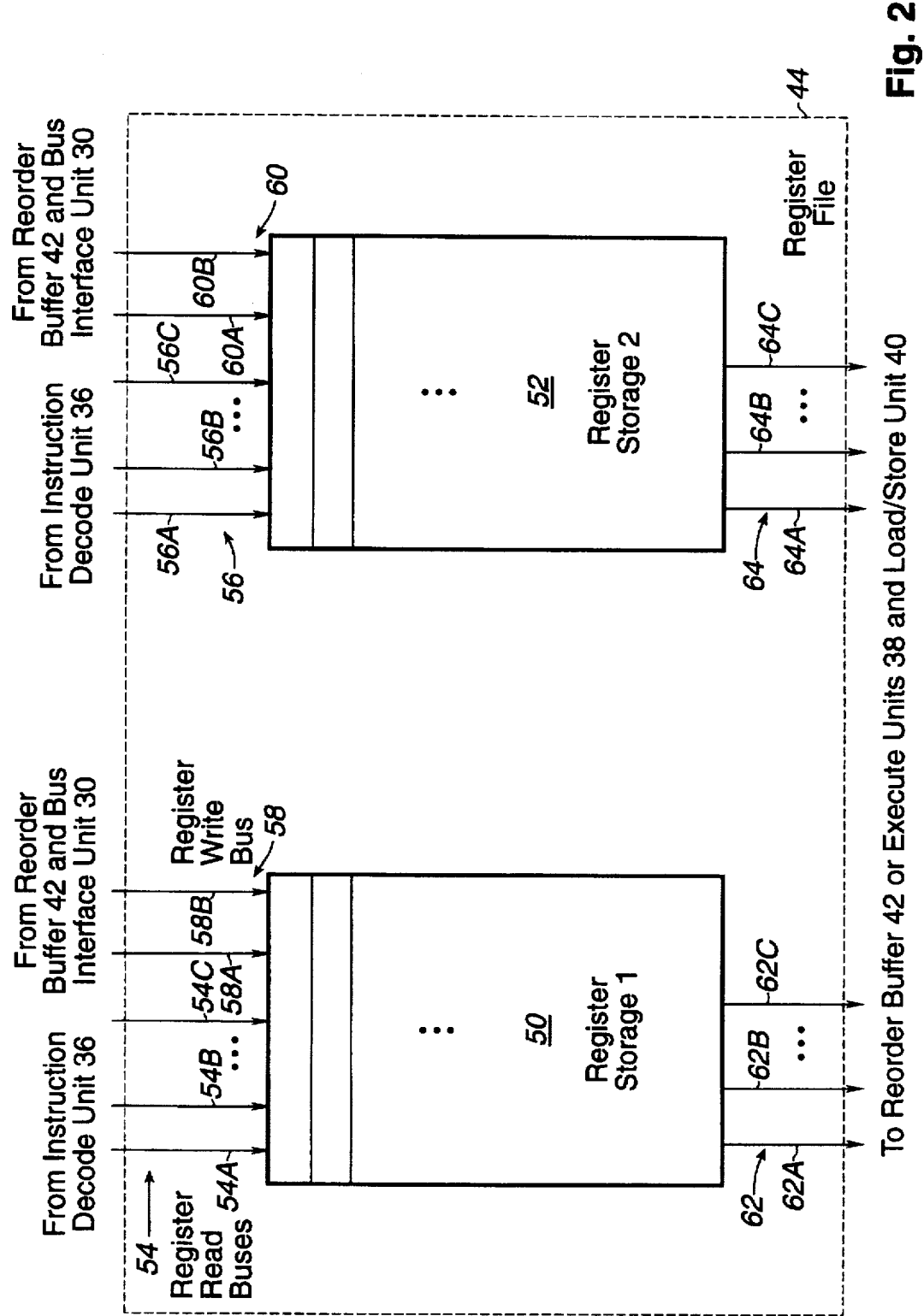
FIG. 2 is a block diagram of one embodiment of a register file according to the present invention.

Turning now to FIG. 2, a block diagram of one embodiment of register file 44 is shown. Register file 44 includes a first register storage 50 and a second register storage 52. Each register storage receives a plurality of register read buses from instruction decode unit 36, and a plurality of register write buses from reorder buffer 42 and bus interface unit 30. Register read buses 54A, 54B, and 54C (which are collectively referred to as register read buses 54) are coupled to register storage 50, while register read buses 56A, 56B, and 56C (which are collectively referred to as register read buses 56) are coupled to register storage 52. Similarly, register write buses 58A and 58B (which are collectively referred to as register write buses 58) are coupled to register storage 50 while register write buses 60A and 60B (which are collectively referred to as register write buses 60) are coupled to register storage 52. Each register read and write bus is coupled to a respective read and write port upon the register storages. A plurality of output buses are coupled to register storage 50. Output buses 62A, 62B, and 62C (which are collectively referred to as output buses 62) serve to represent the plurality of output buses coupled to register store 50. Also a plurality of output buses are coupled to register storage 52. Output buses 64A, 64B, and 64C (which are collectively referred to as output buses 64) serve to represent the plurality of output buses coupled to register store 52.

First register storage 50 stores a portion of the architected register set employed by microprocessor 12. Second register storage 52 stores the remainder of the architected register set. Instruction decode unit 36 conveys indications of registers accessed by instructions being decoded upon register read buses 54 and 56. A particular instruction may access up to one register operand within register storage 50 and up to one register operand within register storage 52. For example, instruction decode unit 36 may decode a first instruction. The first instruction may have a first register operand and a second register operand. Instruction decode unit 36 conveys an indication of the first register operand upon register read bus 54A, and the corresponding register operand is conveyed by first register storage 50 upon output bus 62A. Similarly, an indication of the second register operand is received upon register read bus 56A by second register storage 52, which conveys the corresponding register operand upon output bus 64A. Advantageously, an instruction may access a pair of operands even though each register storage need only provide one read port for use by that instruction. The resulting register file structure may consume less silicon area than a conventional register file having a similar number of ports.

In one embodiment, output buses 62 and 64 convey register operands to reorder buffer 42, which routes the register operands to the appropriate execution unit. Reorder buffer 42 may substitute a speculatively generated register value stored therein for the register operands conveyed by register file 44. In embodiments of microprocessor 12 which do not employ speculative execution, output buses 62 and 64 convey register operands to execute units 38 and load/store unit 40 directly.

Reorder buffer 42 additionally conveys register values corresponding to instructions being retired upon register write buses 58B and 60B. As shown in FIG. 2, up to two instructions may be retired during a clock cycle if the two instructions modify registers stored in separate register storages. Other embodiments may allow more instructions to be retired by including more register write buses.

As noted above, bus interface unit 30 is configured to store values into register file 44. Register write buses 58A and 60A are provided between bus interface unit 30 and register file 44 for this purpose. Bus interface unit 30 receives an indication of the register to be stored to when it receives a command from load/store unit 40 (through data cache 34) to perform a load memory operation which is not to be cached in data cache 34. The indication defines which of register storages 50 and 52 stores the register, as well as the register itself. Bus interface unit conveys the value read from main memory, the register indication, and an asserted write enable signal upon the register write bus 58A or 60A determined from the indication.

The register file shown in FIG. 2 reduces the number of ports employed upon each of the register storages 50 and 52. Further port reduction may be achieved by interleaving accesses upon a single port during a clock cycle. For example, a first access may occupy a first port upon a register storage during a first portion of a clock cycle, and then a second access may occupy the first port during the remainder of the clock cycle.

It is noted that although two register storages are shown in FIG. 2, any number of register storages may be employed in various embodiments of register file 44. It is further noted that register storages 50 and 52 comprise a plurality of storage locations. Register storages 50 and 52 may comprise memory arrays, or may comprise a plurality of discrete registers and associated multiplexors for allowing multiple accesses and modifications to be performed upon the storages concurrently.

Figure 3:
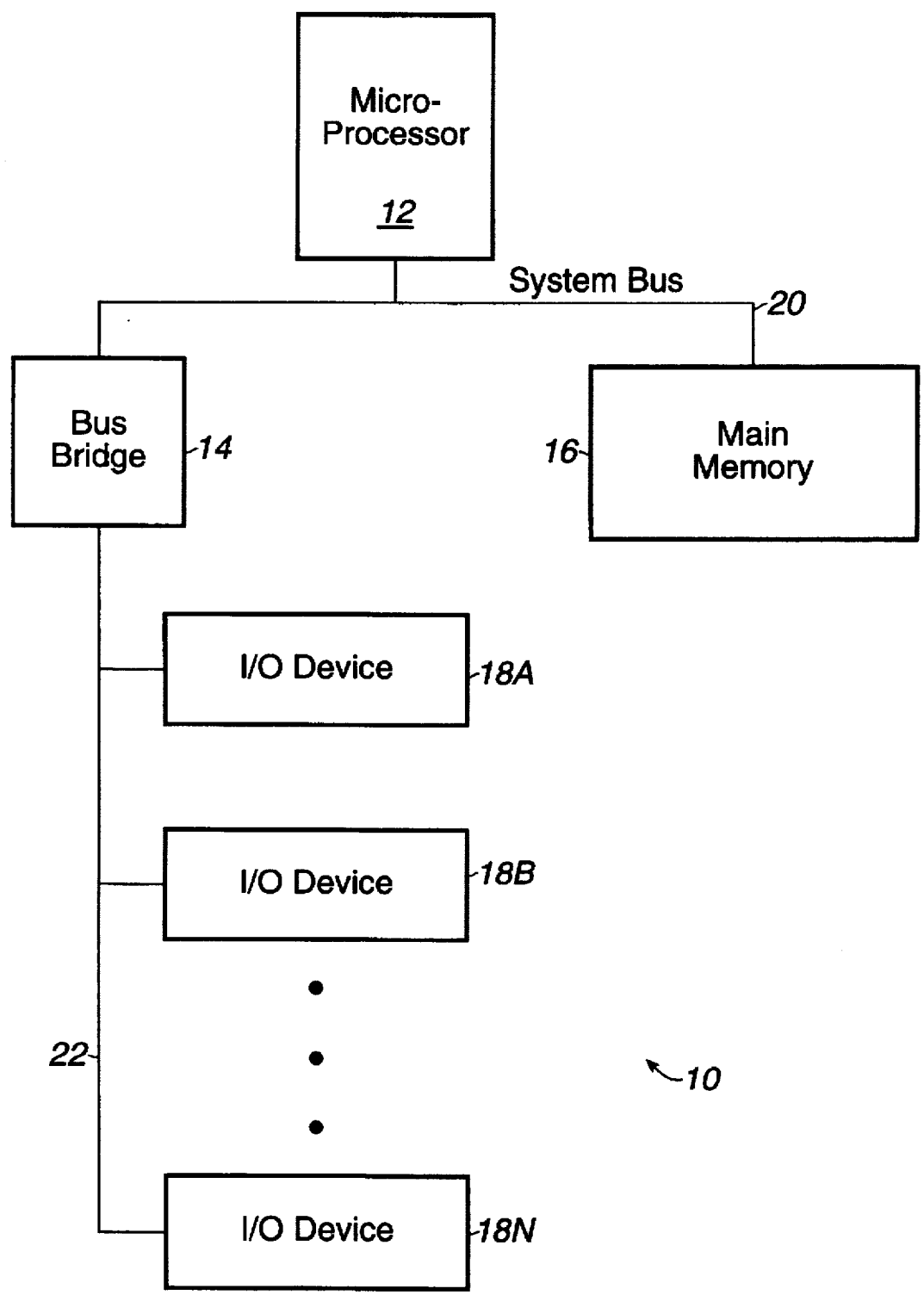
FIG. 3 is a block diagram of a computer system including a microprocessor in accordance with the present invention.

Turning now to FIG. 3, one embodiment of a computer system 10 is shown. Computer system 10 includes microprocessor 12, a bus bridge 14, a main memory 16, and a plurality of input/output (I/O) devices 18A-18N (collectively referred to as I/O devices 18). A system bus 20 couples microprocessor 12, bus bridge 14, and main memory 16. I/O devices 18A-18N are coupled to bus bridge 14 via an I/O bus 22.

Bus bridge 14 is provided to assist in communications between I/O devices 18 and devices coupled to system bus 20. I/O devices 18 typically require longer bus clock cycles than microprocessor 12 and other devices coupled to system bus 20. Therefore, bus bridge 14 provides a buffer between system bus 20 and input/output bus 22. Additionally, bus bridge 14 translates transactions from one bus protocol to another. In one embodiment, input/output bus 22 is an Enhanced Industry Standard Architecture (EISA) bus and bus bridge 14 translates from the system bus protocol to the EISA bus protocol. In another embodiment, input/output bus 22 is a Peripheral Component Interconnect (PCI) bus and bus bridge 14 translates from the system bus protocol to the PCI bus protocol. It is noted that many variations of system bus protocols exist. Microprocessor 12 may employ any suitable system bus protocol.

I/O devices 18 provide an interface between computer system 10 and other devices external to the computer system. Exemplary I/O devices include a modem, a serial or parallel port, a sound card, etc. I/O devices 18 may also be referred to as peripheral devices. Main memory 16 stores data and instructions for use by microprocessor 12. In one embodiment, main memory 16 includes at least one Dynamic Random Access Memory (DRAM) cell and a DRAM memory controller.

It is noted that although computer system 10 as shown in FIG. 3 includes one microprocessor, other embodiments of computer system 10 may include multiple microprocessors similar to microprocessor 12. Similarly, computer system 10 may include multiple bus bridges 14 for translating to multiple dissimilar or similar I/O bus protocols. Still further, a cache memory for enhancing the performance of computer system 10 by storing instructions and data referenced by microprocessor 12 in a faster memory storage may be included. The cache memory may be inserted between microprocessor 12 and system bus 20, or may reside on system bus 20 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a register file has been provided which includes numerous ports. The numerous ports allow a large number of concurrent accesses to the register file to be performed. Each port is coupled to a subset of the registers within the register file, thereby decreasing the size and complexity of the register file. The limited access of each port may be particularly appropriate for DSP data access patterns in which a first portion of the register file is used to store a first data stream of operands and a second portion of the register file is used to store a second data stream of operands. The data streams are often accessed concurrently by an instruction, and therefore a port into each of the portions of the register file may be used by the instruction to access operands from each data stream. Although the size and complexity of the register file are reduced, the register file provides full functionality for the DSP data accesses.

Numerous variations and modifications will become apparent to those skilled in the art once the above disclosure is fully appreciated. It is intended that the following claims be interpreted to embrace all such variations and modifications.

What is claimed is:

1. A register file comprising:

a first register storage having a first read port, wherein said first register storage comprises a first plurality of storage locations, wherein each of said first plurality of storage locations corresponds to one of a first plurality of registers, and wherein any one of said first plurality of storage locations is accessible via a first indication asserted upon said first read port; and a second register storage having a second read port, wherein said second register storage comprises a second plurality of storage locations, wherein each of said second plurality of storage locations corresponds to one of a second plurality of registers, and wherein any one of said second plurality of storage locations is accessible via a second indication asserted upon said second read port;

wherein said first plurality of storage locations comprising said first register storage are inaccessible via said second read port, and wherein said second plurality of storage locations comprising said second register storage are inaccessible via said first read port;

wherein said first register storage and said second register storage may be accessed concurrently via said first read port and said second read port respectively; and wherein said first plurality of registers and said second plurality of registers comprise an architected register set.

2. The register file as recited in claim 1, wherein said first register storage further comprises at least one write port, and wherein any one of said first plurality of storage locations is updateable from said at least one write port.

3. The register file as recited in claim 1, wherein said second register storage further comprises at least one write port, and wherein any one of said second plurality of storage locations is updateable from said at least one write port.

4. The register file as recited in claim 1 wherein said first register storage further comprises a plurality of said first read ports, wherein any one of said first plurality of storage locations is accessible via any of said plurality of said first read ports, wherein said plurality of said first read ports may access said first register storage concurrently.

5. The register file as recited in claim 1 wherein said second register storage further comprises a plurality of said second read ports, wherein any one of said second plurality of storage locations is accessible via any of said plurality of said second read ports, wherein said plurality of said second read ports may access said second register storage concurrently.

6. A microprocessor, comprising:

an instruction decode unit configured to decode an instruction and to convey a first indication of a first register operand of said instruction upon a first read bus and a second indication of a second register operand of said instruction upon a second read bus;

a register file including a first register storage and a second register storage, wherein said first register storage includes a first plurality of registers, and wherein said second register storage includes a second plurality of registers;

wherein said first register storage further includes a first read port coupled to said first read bus, and a first output bus configured to convey said first register operand upon said first output bus in response to receiving said first indication upon said first read port, wherein any one of said first plurality of registers is accessible via the first output bus in response to receiving said first indication;

wherein said second register storage further includes: a second read port coupled to said second read bus; and a second output bus configured to convey said second register operand upon said second output bus in response to receiving said second indication upon said second read port, wherein any one of said second plurality of registers is accessible via the second output bus in response to receiving said second indication; and wherein said first plurality of registers is inaccessible via the second output bus, and wherein said second plurality of registers is inaccessible via the first output bus;

an execute unit coupled to receive said instruction, said first register operand, and said second register operand, wherein said execute unit is configured to execute said instruction upon said first register operand and said second register operand.

7. The microprocessor as recited in claim 6 further comprising a plurality of execute units.

8. The microprocessor as recited in claim 7 further comprising a reorder buffer configured to store instruction execution results prior to their storage within said register file.

9. The microprocessor as recited in claim 8 wherein said reorder buffer is coupled to a first write port upon said first register storage, and wherein said reorder buffer is configured to store a particular instruction execution result into said first register storage via said first write port.

10. The microprocessor as recited in claim 9 wherein said reorder buffer is coupled to a second write port upon said second register storage, and wherein said reorder buffer is configured to store a particular instruction execution result into said second register storage via said second write port.

11. The microprocessor as recited in claim 8 wherein said reorder buffer is coupled between said register file and said plurality of execution units, and wherein said reorder buffer is configured to route said first register operand and said second register operand to one of said plurality of execute units.

12. A computer system comprising:

a microprocessor having a register file, wherein said register file comprises:

a first register storage and a second register storage;

wherein said first register storage comprises a first plurality of registers, and wherein said first register storage is provided with one or more first read ports;

wherein said second register storage comprises a second plurality of registers, and wherein said second register storage is provided with one or more second read ports;

wherein any register of said first plurality of registers can be accessed by any of said one or more first read ports, and wherein said one or more first read ports can access said first register storage concurrently;

wherein any register of said second plurality of registers can be accessed by any of said one or more second read ports, and wherein said one or more second read ports can access said second register storage concurrently;

wherein said first plurality of registers are inaccessible to said one or more second read ports, and wherein said second plurality of registers are inaccessible to said one or more first read ports;

a main memory coupled to said microprocessor, wherein said main memory is configured to store instructions and data for access by said microprocessor.

13. The computer system of claim 12, wherein said register file further comprises one or more register storages in addition to said first register storage and said second register storage, wherein each of said additional register storages comprises a corresponding plurality of registers, wherein each of said additional register storages is provided with one or more read ports.

* * * * *